United States Patent
Yonemura et al.

(10) Patent No.: US 11,591,252 B2
(45) Date of Patent: Feb. 28, 2023

(54) METHOD FOR PRODUCING OPTICAL FIBER PREFORM, AND OPTICAL FIBER PREFORM

(71) Applicant: SUMITOMO ELECTRIC INDUSTRIES, LTD., Osaka (JP)

(72) Inventors: Takumi Yonemura, Yokohama (JP); Noboru Yamazaki, Yokohama (JP); Satoshi Tanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 544 days.

(21) Appl. No.: 16/613,256

(22) PCT Filed: Apr. 13, 2018

(86) PCT No.: PCT/JP2018/015562
§ 371 (c)(1),
(2) Date: Nov. 13, 2019

(87) PCT Pub. No.: WO2018/211880
PCT Pub. Date: Nov. 22, 2018

(65) Prior Publication Data
US 2021/0130220 A1 May 6, 2021

(30) Foreign Application Priority Data

May 15, 2017 (JP) .............................. JP2017-096533

(51) Int. Cl.
*C03B 37/014* (2006.01)
(52) U.S. Cl.
CPC .............................. *C03B 37/01453* (2013.01)
(58) Field of Classification Search
None
See application file for complete search history.

(56) References Cited

U.S. PATENT DOCUMENTS 4,978,378 A 12/1990 Ito et al.
5,713,979 A * 2/1998 Nicholson ........... C03B 37/0146
65/540

(Continued)

FOREIGN PATENT DOCUMENTS

JP H02-9727 A 1/1990
JP H07-157327 A 6/1995
(Continued)

OTHER PUBLICATIONS

Oga et al. JP 07157327 machine translation, Production of preform optical fiber, Jun. 1995 (Year: 1995).*

*Primary Examiner* — Queenie S Dehghan
(74) *Attorney, Agent, or Firm* — Faegre Drinker Biddle & Reath LLP (57) ABSTRACT

A production method and others according to the present embodiment are provided with a structure for effectively preventing occurrence of accidental spiking during drawing of a preform. In order to control the residual He-concentration in the center part of the preform, a transparent glass rod that has a predetermined outer diameter and is already sintered but is not doped with an alkali metal yet is annealed in in the atmosphere not containing He gas for an annealing time determined by referring to result data in which the relationship between the annealing time and the residual He-concentration is previously recorded for each outer diameter. In the result data, actually measured data of the residual He-concentration in a produced optical fiber preform and the annealing time are accumulated as annealing treatment results.

1 Claim, 11 Drawing Sheets

(56) References Cited

U.S. PATENT DOCUMENTS

| | | | |
|---|---|---|---|
| 2005/0063663 A1* | 3/2005 | Anderson | C03B 37/01473 385/142 |
| 2010/0122558 A1* | 5/2010 | Jewell | C03B 37/0146 65/508 |
| 2013/0034654 A1 | 2/2013 | Haruna et al. | |
| 2014/0254997 A1 | 9/2014 | Tamura et al. | |
| 2015/0098682 A1 | 4/2015 | Tamura et al. | |
| 2015/0329404 A1 | 11/2015 | Miyabe et al. | |
| 2015/0370008 A1 | 12/2015 | Tamura et al. | |
| 2016/0318792 A1 | 11/2016 | Suganuma et al. | |

FOREIGN PATENT DOCUMENTS

| | | |
|---|---|---|
| JP | H11-209139 A | 8/1999 |
| JP | 2003-300736 A | 10/2003 |
| JP | 2005-537210 A | 12/2005 |
| JP | 2011-57490 A | 3/2011 |
| JP | 2013-32241 A | 2/2013 |
| JP | 2013-107792 A | 6/2013 |
| JP | 2014-166941 A | 9/2014 |
| WO | WO-2004/020357 A2 | 3/2004 |
| WO | WO 2005/021455 A2 | 3/2005 |
| WO | WO-2014/119415 A1 | 8/2014 |
| WO | WO-2015/107931 A1 | 7/2015 |
| WO | WO-2016/007693 A1 | 1/2016 |

\* cited by examiner

| STEP | ROD-IN COLLAPSE STEPS |
|---|---|
| ST71 | |
| ST72 | |
| ST73 | |

RESULT DATA
700

FOR EACH CENTER ROD DIAMETER R

R=30mm

| ANNEALING TIME (hour) | RESIDUAL He-CONCENTRATION (WEIGHT ppm) | CONCENTRATION ACTUAL MEASUREMENT VALUE (WEIGHT ppm) |
|---|---|---|
| 2.5 | 0.260 | |
| 5 | 0.200 | 0.2 |
| 11.5 | 0.159 | |
| 10 | 0.127 | |
| 12.5 | 0.102 | |
| 15 | 0.083 | |
| 17.5 | 0.067 | |
| 20 | 0.054 | 0.07 |
| 22.5 | 0.043 | |
| 25 | 0.035 | 0.03 |
| 30 | 0.023 | |

METHOD FOR PRODUCING OPTICAL FIBER PREFORM, AND OPTICAL FIBER PREFORM

TECHNICAL FIELD

The present invention relates to a method for producing an optical fiber preform doped with an alkali metal, and an optical fiber preform produced by the method.

BACKGROUND ART

One method for producing an optical fiber preform has conventionally included subjecting a glass raw material to a flame hydrolysis reaction, depositing (soot deposition) resulting glass fine particles on a rotating starting material, and sintering an obtained porous preform (vitrification to a transparent glass). The sintering step is typically performed in a He atmosphere. This is because the transparent glass can be easily obtained when sintered in a gas atmosphere having high solubility in glass. Specifically, remaining bubbles exist in the obtained transparent glass in an Ar or $N_2$ atmosphere, but it has been found that a transparent glass free of remaining bubbles can be obtained easily in a highly soluble He atmosphere. For this reason, the porous preform is generally sintered in the He atmosphere.

The optical fiber preform including the glass portion sintered as described above is spun into thin optical fiber having an outer diameter of 100 μm to 200 μm in the drawing step. In the drawing step, a phenomenon (hereinafter referred to as "spiking") in which the outer diameter (glass diameter) of the drawn optical fiber fluctuates by 1 or more may occur suddenly. It is known that this phenomenon is caused by bubbles generated in the optical fiber preform and mainly containing He (99% or more). Patent Documents 1 to 3 describe methods for reducing a residual He-concentration in the transparent glass after sintering.

CITATION LIST

Patent Literature

Patent Document 1: Japanese Patent Application Laid-Open No. H2-9727
Patent Document 2: Japanese Patent Application Laid-Open No. H7-157327
Patent Document 3: Japanese Patent Application Laid-Open No. H11-209139
Patent Document 4: Japanese Patent Application Laid-Open No. 2005-537210

SUMMARY OF INVENTION

Technical Problem

As a result of examining the conventional methods for producing the optical fiber preform, the inventors have found the following problems. Specifically, the conventional techniques described in Patent Documents 1 to 3 described above perform heat treatment in an atmosphere other than the He gas atmosphere, or in a vacuum, on a transparent glass after sintering, thereby adjusting (or preventing the occurrence of spiking during the drawing of the preform) the initial He-concentration (the residual He-concentration during vitrification to provide a transparent glass by sintering). However, in a glass containing an alkali metal, it is necessary to further reduce the residual He-concentration. Note that, regarding the optical fiber preform doped with an alkali metal, Patent Document 4 describes heating the target glass to 1,500° C. or higher to diffuse the alkali metal rapidly in the glass to prevent denitrification due to glass crystallization.

However, none of the above Patent Documents 1 to 4 recites appropriate heating time (annealing time) for effectively preventing generation of bubbles of the He gas. In particular, the heating time largely depends on the outer diameter of the target glass, but it is currently unfeasible to set appropriate heating time for the size of the glass to be heated. Therefore, performing the heat treatment for long time without any ground in the producing step of the optical fiber preform containing the alkali metal would unnecessarily extend a total producing time of the optical fiber preform. Further, if the adjustment of He-concentration based on the initial He-concentration (insufficient reduction of the He-concentration) as in the prior art technique is applied to the production of optical fiber preforms containing the alkali metal, excessive treatment time is required for drawing the preform to prevent the occurrence of spiking (the drawing speed needs to be lowered to prevent the occurrence of spiking). As a result, such a situation may cause a factor for the decrease in the production yield of the optical fiber preform containing the alkali metal.

The present invention has been made to solve the above-described problems, and it is an object of the present invention to provide a method for producing an optical fiber preform including an alkali metal and having a structure for effectively preventing the occurrence of accidental spiking during the drawing of the preform, and an optical fiber preform obtained by the method.

Solution to Problem

In order to solve the above-described problem, a method for producing an optical fiber preform according to the present embodiment controls a residual He-concentration that causes the occurrence of spiking (a phenomenon in which fluctuations in the outer diameter of 1 μm or more occur suddenly in the optical fiber obtained by drawing the preform) by annealing, in the atmosphere not containing He gas, a transparent glass rod having a predetermined outer diameter for the annealing time determined by referring to result data in which a relationship between annealing time and the residual He-concentration is recorded, the transparent glass rod to be annealed being one after sintering and before doping an alkali metal. Further, to the result data, actually measured data of the residual He-concentration in a produced optical fiber preform and annealing time are accumulated as annealing treatment results of the transparent glass rod.

Advantageous Effects of Invention

As described above, according to the method for producing the optical fiber preform according to the present embodiment, the optical fiber preform capable of effectively preventing the occurrence of accidental spiking during drawing of the preform is obtained.

DESCRIPTION OF EMBODIMENTS

Description of Embodiment of Invention of Present Application

First, the contents of the embodiments of the invention of the present application will be recited and described individually.

(1) One aspect of the present embodiment relates to a method for producing an optical fiber preform including a core preform and a cladding portion provided on an outer periphery of the core preform. The core preform is constituted by one or more glass regions each comprised of silica glass as a main component, and includes a center rod having an alkali metal doped region formed along a longitudinal direction. The cladding portion is also constituted by one or more glass regions each comprised of silica glass as a main component. In this aspect, the production method at least includes a core preform producing step, a cladding portion producing step, and a measuring step. The core preform producing step at least includes a rod producing step, doping step, and a diameter expanding step. In the rod producing step, a transparent glass rod configured to be a center rod and having a predetermined outer diameter is produced by performing dehydration treatment in an atmosphere containing a Cl (chlorine) gas on a porous rod in which glass particles are deposited along a longitudinal direction, and sintering treatment on the porous rod after the dehydration in an atmosphere containing He (helium) gas. In the doping step, an alkali metal is doped into the transparent glass rod along the longitudinal direction of the transparent glass rod. In the diameter expanding step, a peripheral core portion is formed on the outer periphery of the center rod (including the alkali metal doped region) obtained through the doping step by, for example, rod-in collapsing using the obtained center rod. In the cladding portion forming step, a cladding portion constituted by one or more glass regions is formed on the outer periphery of the core preform obtained by the core preform producing step. Further, in the measuring step, a residual He-concentration in the region corresponding to the above-described center rod is measured in a sample preform cut out from the optical fiber preform obtained by the cladding portion producing step.

(2) More specifically, in one aspect of the present embodiment, the core preform producing step includes determining annealing time performed between the rod producing step and the doping step, and a first annealing treatment step. In the annealing time determining step, time taken for annealing treatment on the transparent glass rod is determined by referring to result data including a table of the He-concentration-to-time representing a relationship between the annealing time and the residual He-concentration that depends on the specific outer diameter of the transparent glass rod. In the first annealing treatment step, the transparent glass rod is annealed in an atmosphere not containing the He gas, such as $N_2$ (nitrogen) gas or Ar (argon) gas, for at least the determined annealing time. Meanwhile, in the measuring step, in addition to measuring the residual He-concentration in the center region (region corresponding to the center rod) in a sample preform, and the update of result data is performed. Specifically, in the measuring step, the result data is updated by accumulating the annealing time determined by the annealing time determining step and the measured residual He-concentration as the treatment result for each outer diameter of the transparent glass rod annealed in the first annealing treatment step.

(3) As another aspect of the present embodiment, the production method may further include a second annealing treatment step for predetermined time on the optical fiber preform obtained by the cladding portion producing step between the cladding portion producing step and the measuring step in the atmosphere not containing the He gas. In this case, the annealing time in the second annealing treatment step may be fixed. Further, the annealing time in the first annealing treatment step is preferably longer than the annealing time in the second annealing treatment step.

(4) The optical fiber preform according to the present embodiment is obtained by the method for producing the optical fiber preform according to the various aspects described above. Specifically, in one aspect, the optical fiber preform preferably has a maximum value of the residual He-concentration in the center rod to be adjusted to 0.15 [weight ppm] or less. Typically, the optical fiber preform containing an alkali metal in glass tends to cause glass crystallization (crystallization of a glass region containing an alkali metal) by heating. In particular, if there are minute crystal nuclei, bubbles are likely to be generated starting from such nuclei. Conventionally, the spiking can be sufficiently prevented by adjusting the fluctuations with respect to the initial He-concentration (the residual He-concentration during vitrification to provide a transparent glass by sintering), but in the glass containing alkali metal, it is necessary to further reduce the residual He-concentration. Specifically, in adjusting the He-concentration on the basis of the initial He-concentration, excessive treatment time is required for drawing the preform to prevent the occurrence of spiking (the speed of drawing needs to be lowered to prevent the occurrence of spiking). Therefore, the present embodiment can achieve stable drawing of the preform in appropriate treatment time by previously adjusting an absolute amount of residual He-concentration in the center portion of the preform, to be doped with the alkali metal, to fall within an appropriate range before doping the alkali metal.

(5) Further, in another aspect of the present embodiment, a maximum value of a Cl-concentration in the center rod is preferably adjusted to 1,000 ppm or less. With a high Cl-concentration, crystallization of the glass region containing the alkali metal is promoted, thus facilitating the occurrence of spiking during drawing of the preform. Preferably, to prevent the occurrence of spiking, the Cl-concentration is low and the residual He-concentration is not more than a predetermined value. Crystallization of the glass region containing the alkali metal becomes particularly outstanding when the annealing time increases. Therefore, according to the present embodiment, by adjusting both the Cl-concentration and the residual He-concentration to low values, the crystallization of the center portion of the preform containing the alkali metal is effectively prevented.

Note that the aspects described in [Description of Embodiments of Invention of Present Application] above are applicable to each of the remaining aspects or to all combinations of the remaining aspects.

Details of Embodiments of Invention of Present Application

A method for producing an optical fiber preform and specific examples of the optical fiber preform according to the invention of the present application will be described in detail below with reference to the accompanying drawings. The present invention is not limited by the illustrated examples given below and, instead, is defined by the scope of the appended claims and intended to include whatever changes as would be equivalent to and fall within the scope and spirit of the appended claims. Further, in the description of the drawings, the same reference signs are given to the same elements, and the description thereof will not be repeated.

Figure 1:
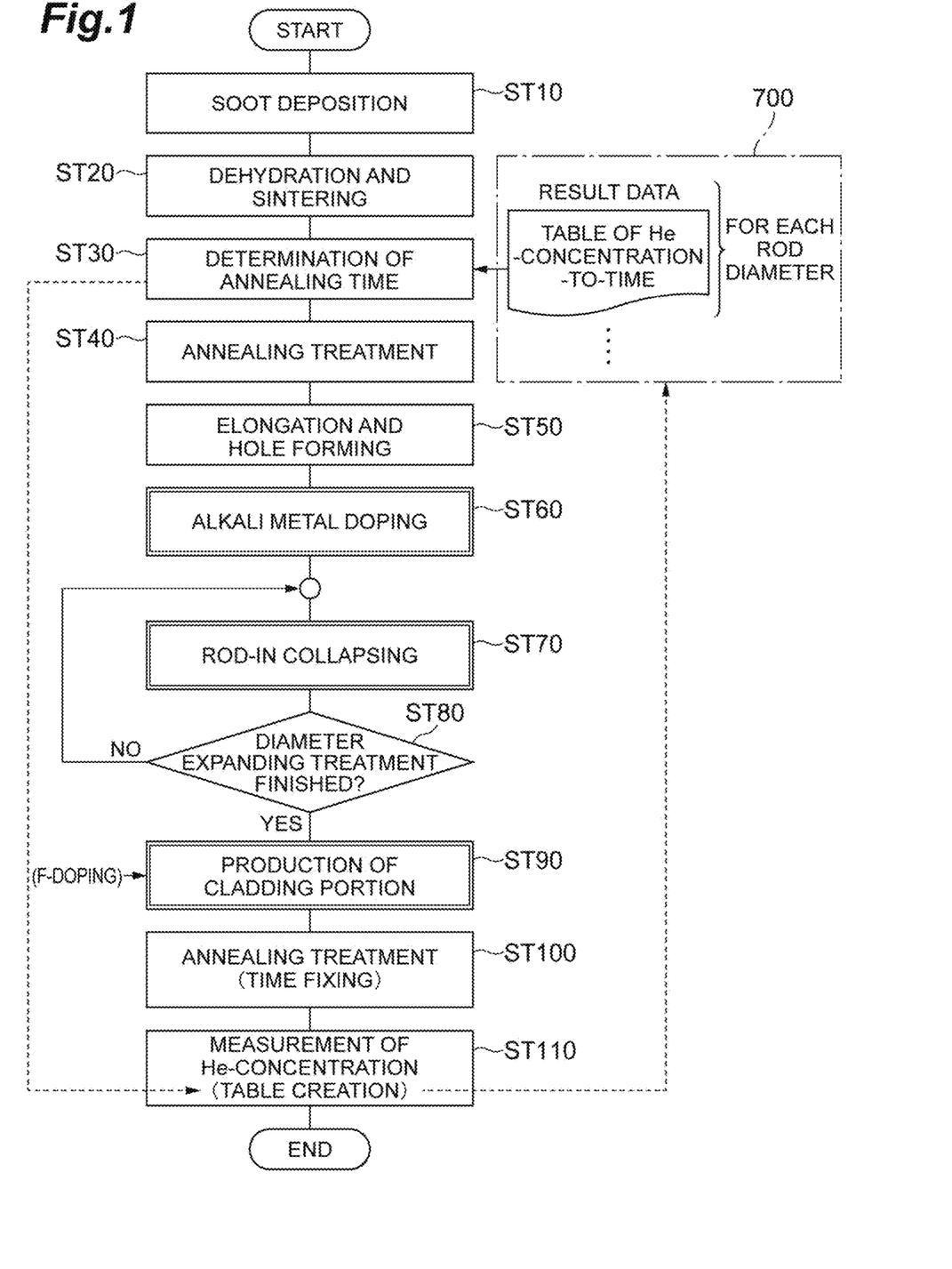
FIG. 1 is a flowchart for explaining a method for producing an optical fiber preform according to an embodiment.

An optical fiber preform produced by the method for producing the optical fiber preform according to the present embodiment is produced according to a flowchart illustrated in FIG. 1, and includes a core preform and a cladding portion provided on the outer periphery of the core preform. The core preform is constituted by one or more glass regions each having silica glass as a main component, and includes a center rod in which an alkali metal doped region is formed along a longitudinal direction. The cladding portion is also constituted by one or more glass regions each comprised of silica glass as a main component. The core preform corresponds to a core of the optical fiber obtained by drawing the optical fiber preform, and the cladding portion corresponds to cladding of the optical fiber (having a lower refractive index than the core). Further, FIG. 1 is a flowchart for explaining a method for producing an optical fiber preform according to the present embodiment.

Figure 2:
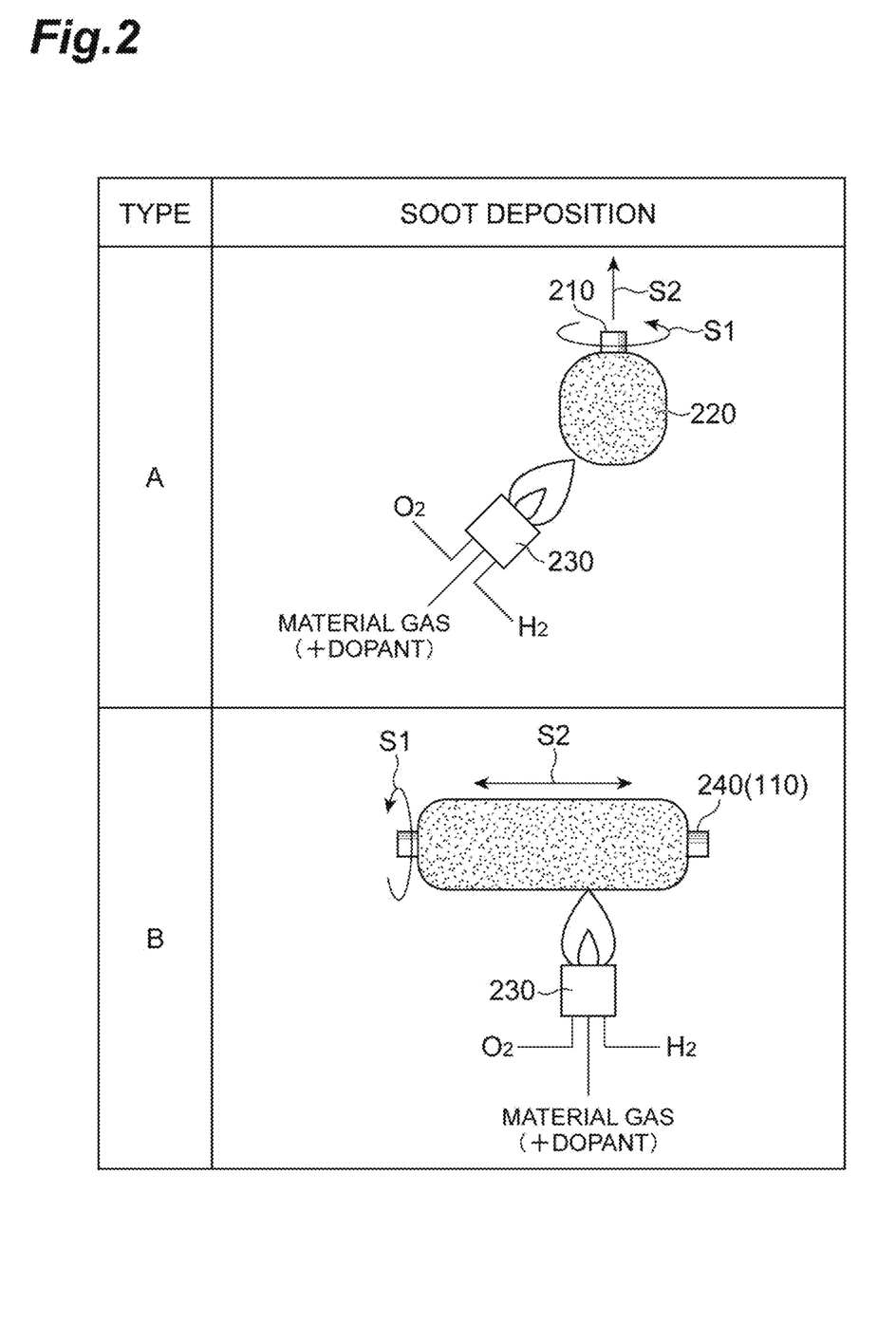
FIG. 2 is a diagram for explaining a soot deposition step.

As illustrated in FIG. 1, the method for producing the optical fiber preform according to the present embodiment at least includes a core preform producing step, a cladding portion producing step, and a measuring step. Further, the core preform producing step at least includes a rod producing step, a doping step, and a diameter expanding step. In the rod producing step, a porous rod (soot body) in which glass fine particles are deposited along a longitudinal direction is first produced (step ST10: soot deposition step). In the soot deposition step of step ST10, as illustrated in FIG. 2, the porous rod is produced by VAD (vapor-phase axial deposition) or OVD (outside vapor deposition). Subsequently, in a heating apparatus illustrated in FIG. 3, the obtained porous rod is subsequently subjected to dehydration treatment in an atmosphere containing the Cl gas and, sintering treatment of the porous rod after the dehydration treatment in an atmosphere containing the He gas (step ST20: a dehydration and sintering step). As a result, a transparent glass rod having an outer diameter R is obtained after the dehydration and sintering step in step ST20.

Figure 4:
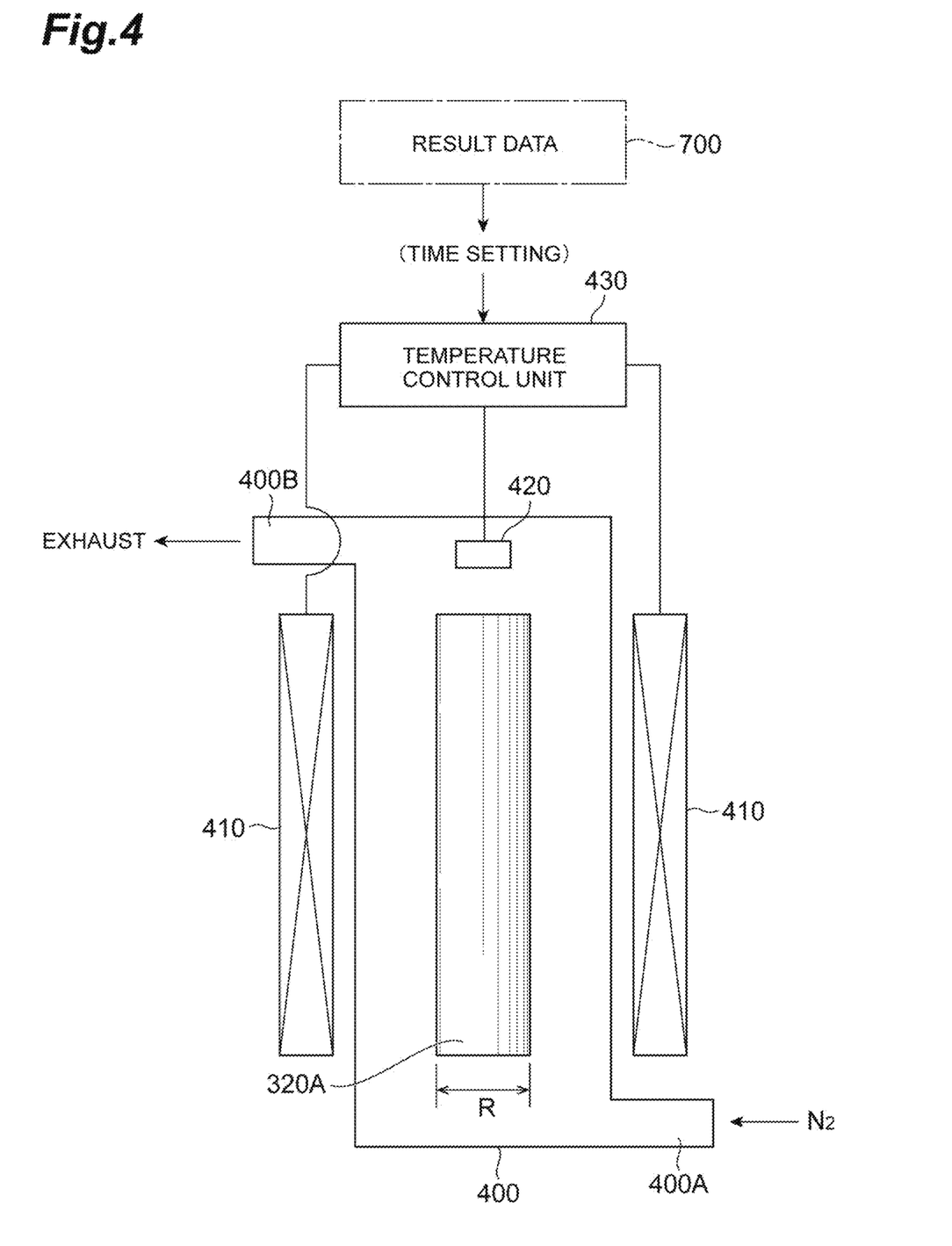
FIG. 4 is a diagram for explaining an annealing treatment step.

The produced transparent glass rod having the outer diameter R is once disposed in the heating apparatus illustrated in FIG. 4, and before the doping step, the transparent glass rod is subjected to a step of determining annealing time (step ST30) and a first annealing treatment step (step ST40). The annealing time determining step in step ST30 is a step of adjusting He-concentration of He remaining in the transparent glass rod in the production step described above, and is performed to prevent generation of bubbles due to the He gas causing spiking that accidentally occurs during the drawing of the optical fiber preform to be obtained finally (1 µm or more fluctuations of the outer diameter occurring accidentally in the drawn optical fiber). In the annealing time determining step, the time taken for the annealing treatment of the transparent glass rod is determined using result data 700 prepared for each outer diameter of the transparent glass rod and storing relationships between the annealing time and the residual He-concentration (step ST30). Note that the result data 700 includes a table of He-concentration-to-time (theoretical values) indicating the relationship between the annealing time depending on the center rod having a specific outer diameter and the residual He-concentration. Further, the relationship (theoretical values) between the annealing time and the residual He-concentration depending on other outer diameters can be calculated from existing table data (theoretical values). In the first annealing treatment step, the transparent glass rod is annealed in an atmosphere not containing the He gas, such as an $N_2$ gas atmosphere, for the determined annealing time (step ST40). By the annealing treatment, concentrations of He and Cl remaining in the transparent glass rod are lowered. Note that the first annealing treatment step may be performed in an atmosphere of Ar gas or the like.

Figure 5:
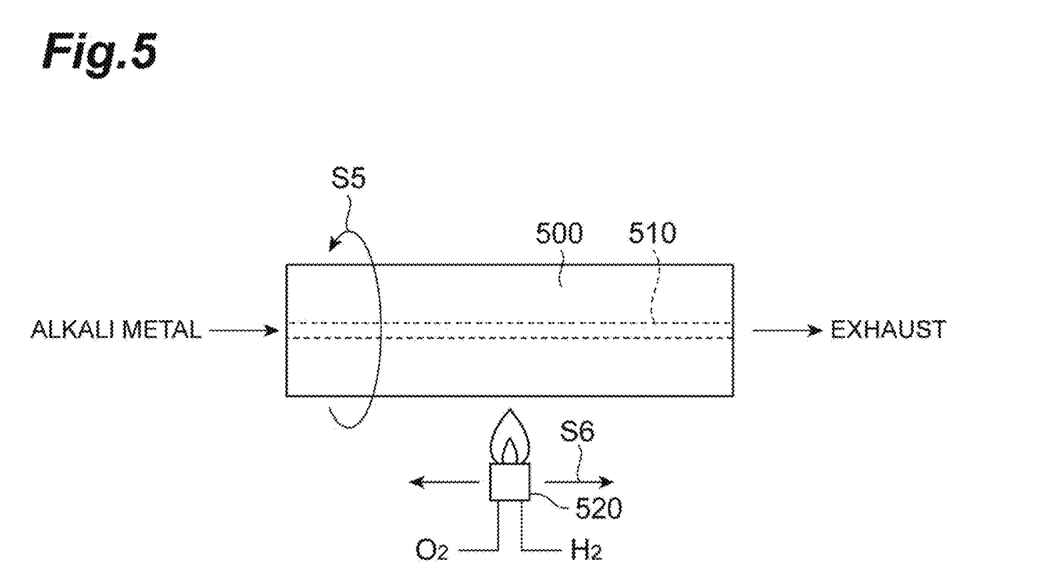
FIG. 5 is a diagram for explaining an alkali metal doping step.
Figure 6:
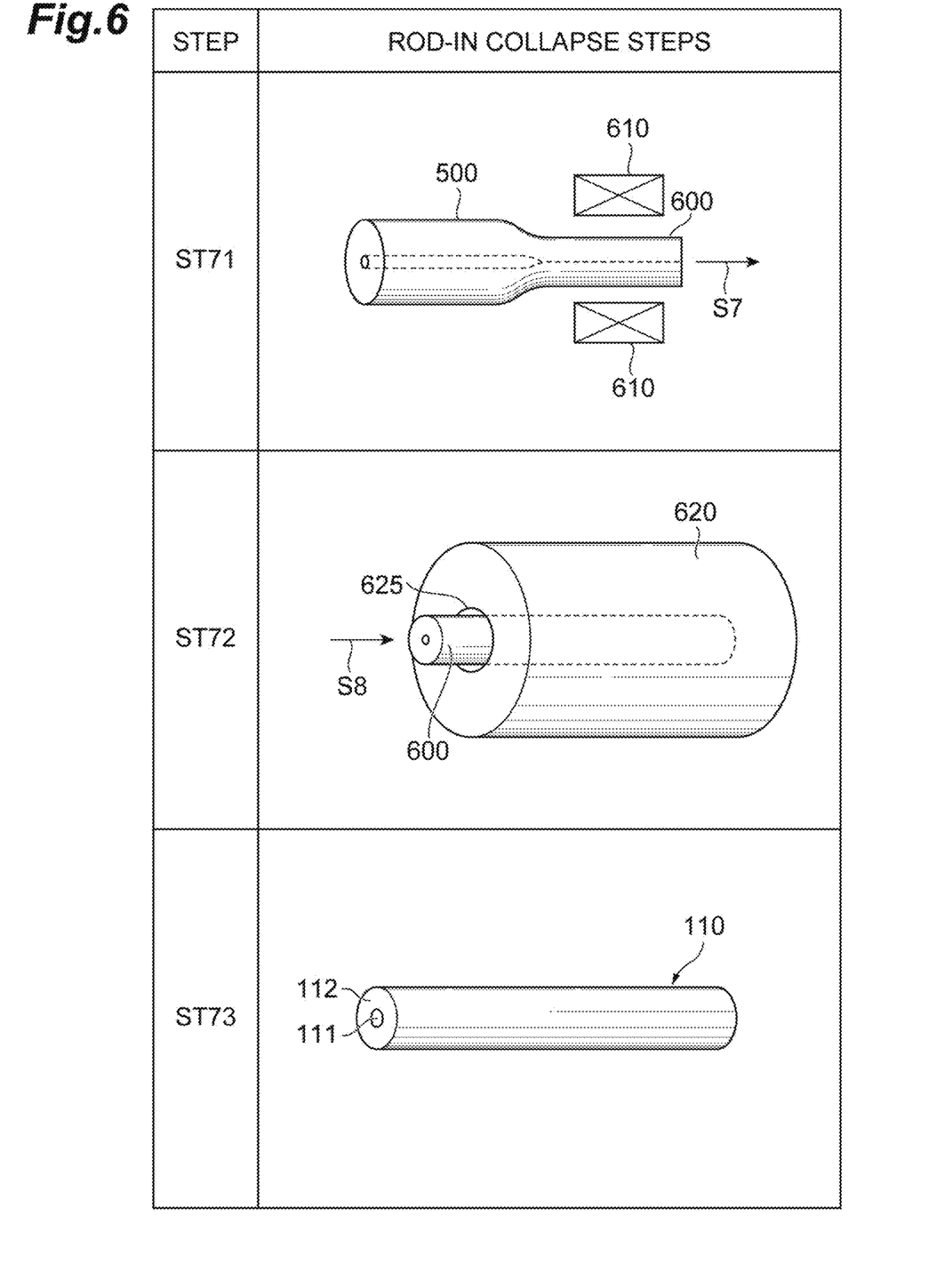
FIG. 6 is a diagram for explaining representative steps of the core preform producing step from the alkali metal doping step to the completion of the core preform.

Next, the doping step is performed on the annealed transparent glass rod. In the doping step, after the annealed transparent glass rod is elongated, a hole extending along the longitudinal direction is formed in the center region of the transparent glass rod (step ST50). Subsequently, as illustrated in FIG. 5, an alkali metal such as K (potassium) is doped to the inner peripheral surface of the hole formed in the transparent glass rod by CVD (chemical vapor deposition) (step ST60). Then, a core preform is obtained by rod-in collapsing (step ST70). Note that, in the rod-in collapsing in step ST70, as illustrated in FIG. 6, the transparent glass rod after step ST60 is collapsed to obtain a center rod (step ST71). Further, to obtain the core preform having a desired outer diameter, a peripheral core portion is provided on the outer periphery of the center rod by the rod-in collapsing (step ST72). The rod-in collapsing also includes elongating the integrated glass body until a desired outer diameter is obtained after integrating the glass rod and a glass tube into which the glass rod is inserted. Further, the peripheral core portion provided on the outer periphery of the center rod may be constituted by a plurality of layers, and by performing the rod-in collapsing of step ST70 plural times (step ST80: diameter expanding treatment), a core preform having a desired outer diameter is obtained (step ST73).

As described above, the core preform producing step includes steps ST10 to ST80, and the cladding portion in which F (fluorine) is doped to the outer periphery of the core preform obtained by the core preform producing step is formed (step ST90: cladding portion producing step). As illustrated in FIG. 2, by the cladding portion producing step of step 90, fine glass particles are deposited while F is doped to the outer periphery of the core preform by OVD to produce the porous rod. Subsequently, the dehydration and sintering are performed in the heating apparatus illustrated in FIG. 3, and the obtained sintered body is subjected to elongation treatment to obtain the optical fiber preform having the desired outer diameter. Note that the cladding portion produced by the cladding portion producing step of step ST90 may be constituted by a plurality of layers having different refractive indexes.

After the cladding portion producing step in step ST90, a second annealing treatment step is performed to adjust the residual He-concentration in the cladding portion (step ST100), and an optical fiber preform is obtained. The second annealing treatment may be performed under certain conditions (e.g., annealing time: 5 hours, annealing temperature: 1,050° C.) regardless of the outer diameter of the preform. Note that the lower limit of the annealing temperature is preferably set in the range of 900° C. to 1,000° C., and the upper limit of the annealing temperature is preferably set in the range of 1,000° C. to 1,100° C. As described above, glass fiber crystallization is likely to occur in the optical fiber preform containing the alkali metal, particularly in the glass region in the vicinity of the alkali metal doped region, so that the bubbles of the He gas are more likely generated starting from the microcrystal nuclei. Therefore, in the first annealing treatment, it is necessary to reduce the remaining concentrations of He and Cl by performing sufficient annealing on the transparent glass rod before doping the alkali metal. Therefore, the annealing time of the first annealing treatment is set to be longer than the annealing time of the second annealing treatment.

Figure 7:
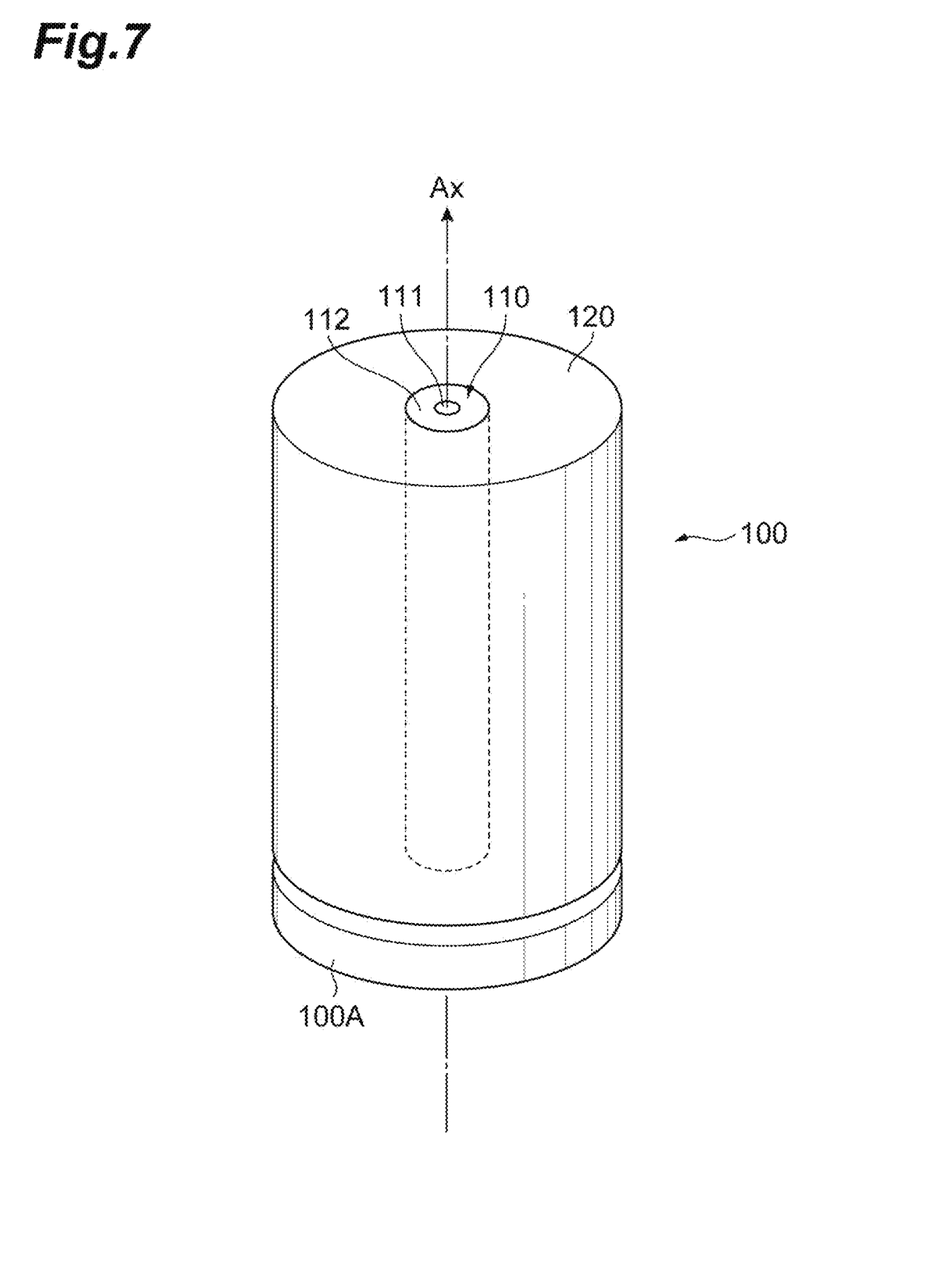
FIG. 7 is a diagram for explaining a measuring step.

Further, in the present embodiment, the optical fiber preform is obtained by the core preform producing step of steps ST10 to ST80 including the annealing time determining step (step ST30) and the first annealing treatment step (step ST40), the cladding portion producing step of step ST90, and the second annealing treatment step of step ST100, and the optical fiber preform is then subjected to measuring of the residual He-concentration and updating of the result data (creating a table) (step ST110). Specifically, as illustrated in FIG. 7, in the measuring step ST110, in a sample preform cut out from the obtained optical fiber preform in a ring shape, the residual He-concentration is first measured in a region corresponding to the above-described center rod. The residual He is quantified by high-frequency heating-type temperature-programmed desorption. When quantifying the residual He by this method, the weight of the sample in the region to be quantified is used, so that unnecessary regions other than the region (center rod) doped with the alkali metal are removed from the sample preform by pretreatment such as cleaving and polishing, thus allowing quantification of the residual He in the center rod. As a result of investigating the residual He in the region corresponding to the center rod by this method, the maximum value of the He-concentration is preferably 0.15 [weight ppm] or less to prevent spiking, and the Cl-concentration is preferably 1,000 ppm or less to further prevent glass crystallization. Further, in the measuring step, in addition to measuring the residual He-concentration in the center region (the region corresponding to the center rod) in the sample preform, the result data is updated by updating of the result data, that is, by accumulating the annealing time determined by the annealing time determining step and the measured residual He-concentration, as the treatment results of the transparent glass rod annealed in the first annealing treatment step (step ST40).

Hereinafter, the operation of each step described above will be described in detail with reference to FIGS. 2 to 10.

FIG. 2 is a diagram for explaining the above-described soot deposition step (the cladding portion producing steps of ST10 and ST90 in the core preform producing step). As illustrated in FIG. 2, the soot deposition step at least includes type A: VAD (vapor-phase axial deposition) and type B: OVD (outside vapor deposition).

Specifically, in the soot deposition step (type A) by the VAD, a porous body 220 is formed by a predetermined soot depositing device. The soot depositing device includes a container having at least an exhaust port and a support mechanism for supporting the porous body 220. Specifically, the support mechanism is provided with a support rod that can rotate in a direction indicated by arrow S1, and a starting rod 210 for growing the porous body 220 (soot body) is attached to the tip of the support rod. Further, in the soot deposition step by the VAD, a burner 230 for depositing the porous body 220 (soot body) is provided, and a desired material gas (e.g., GeCl$_4$, SiCl$_4$), combustion gases (H$_2$ and O$_2$), and a carrier gas such as Ar or He are provided to the burner 230 from the gas supply system. The material gas may contain a dopant for adjusting the refractive index.

During the production of the porous body 220, in the flame of the burner 230, glass particles are generated by hydrolysis reaction of the material gas supplied from the gas supply system, and these glass particles are deposited on the lower surface of the starting rod 210. During this time, the support mechanism pulls up the starting rod 210 in the direction indicated by the arrow S2, while rotating the starting rod 210 in the direction indicated by arrow S1. By this operation, the porous body 220 grows on the lower surface of the starting rod 210 toward the lower side of the starting rod 210, and finally a porous rod 310 (FIG. 3) which acts as the center rod is obtained.

In the soot deposition step (type B) by the OVD, the soot depositing device also includes a container having at least an exhaust port and a support mechanism for supporting the mandrel 240 and the porous body deposited on the outer periphery thereof. Specifically, the support mechanism is capable of rotating the mandrel 240 in the direction indicated by the arrow S1, and reciprocates the mandrel 240 in the direction indicated by the arrow S2 while depositing the porous body on the outer periphery of the mandrel 240. Thus, the porous body is obtained on the outer periphery of the mandrel 240. Note that, in the cladding portion producing step of step ST90, the core preform 110 produced by the core preform producing step is used as the mandrel 240. Further, the device for performing the soot deposition step by the OVD is provided with a burner 230 for depositing a porous body on the outer periphery of the mandrel 240, and a desired material gas (e.g., GeCl$_4$, SiCl$_4$,) including a dopant for adjusting the refractive index, a combustion gas (H$_2$ and O$_2$), and a carrier gas such as Ar or He are supplied to the burner 230 from the gas supply system.

Figure 3:
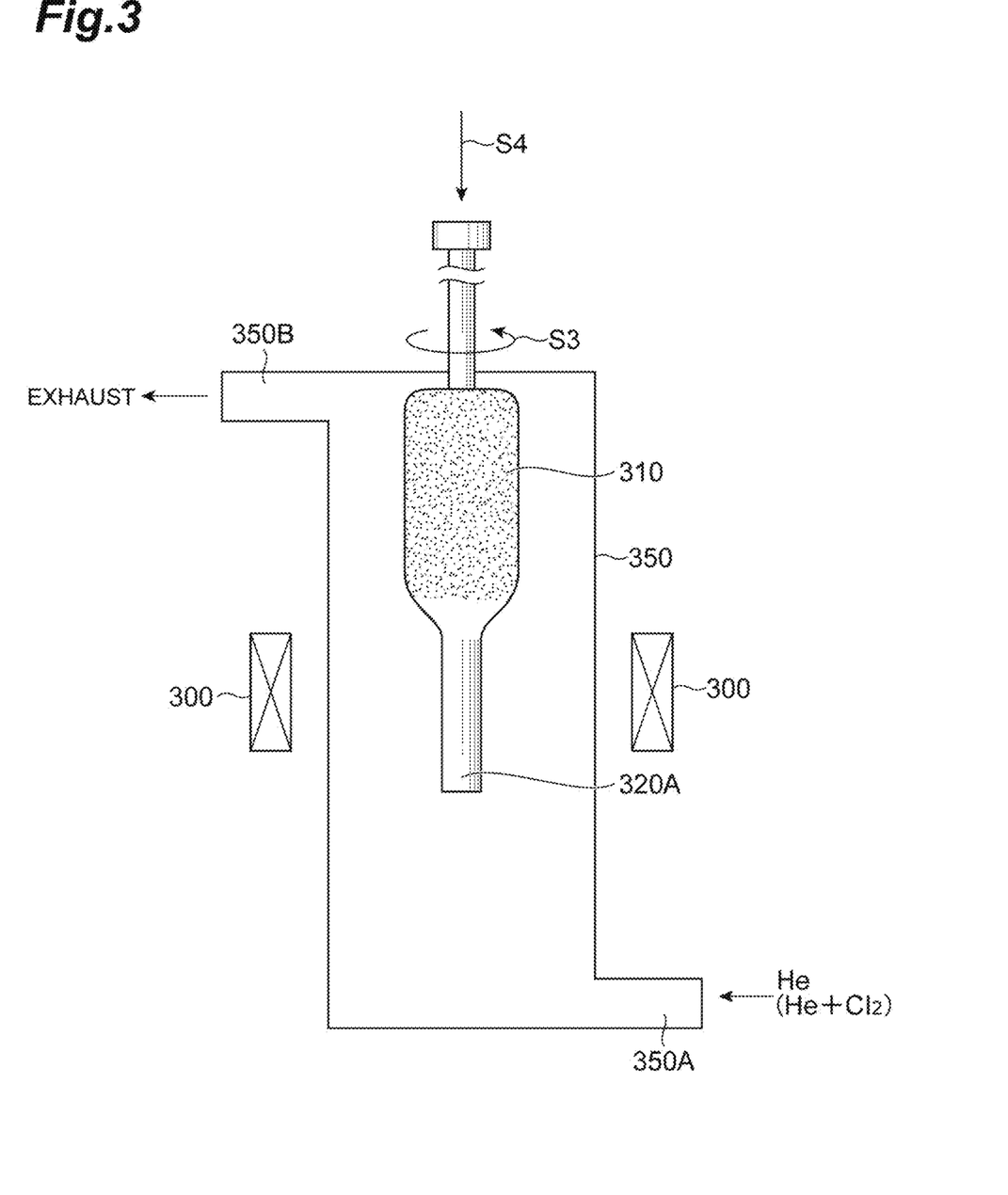
FIG. 3 is a diagram for explaining a dehydration and sintering step.

FIG. 3 is a diagram for explaining the dehydration and sintering step in the core preform producing step (step ST20) and the dehydration and sintering step in the cladding producing step (step ST90). An apparatus illustrated in FIG. 3 performs dehydration treatment and sintering treatment (vitrification to a transparent glass) with the porous rod 310 obtained by the soot deposition device illustrated in FIG. 2 being deposited inside the apparatus. The apparatus in FIG. 3 includes a heating container 350 provided with a heater 300. The heating container 350 has a gas inlet 350A and a gas outlet 350B. A support mechanism is provided on the upper part of the heating container 350. The support mechanism rotates the porous rod 310 in a direction indicated by arrow S3 while supporting the porous rod 310 and moves the porous rod 310 in a direction indicated by arrow S4, whereby changing the relative position of the porous rod 310 with respect to the heater 300.

In the dehydration step of step ST20, the support mechanism first moves the porous rod 310 in the direction indicated by the arrow S4 while rotating the porous rod 310 in the direction indicated by the arrow S3, whereby the porous rod 310 is heated by the heater 300. Meanwhile, He gas and Cl gas are introduced into the heating container 350 from the gas inlet 350A, and the introduced gases are discharged from the gas outlet 350B. By this step, OH groups in the porous rod 310 are removed.

Subsequently, in the sintering step of step ST20, the support mechanism also moves the porous rod 310 after the dehydration treatment in the direction indicated by the arrow S4 while rotating the porous rod 310 in the direction indicated by the arrow S3, whereby the porous rod 310 is heated by the heater 300. A temperature to heat the porous rod 310 is about 1,500° C. During heating, only He gas is introduced into the heating container 350 from the gas inlet 350A, and the introduced He gas is discharged from the gas outlet 350B. By this step, a transparent glass rod 320A is obtained.

The transparent glass rod 320A having an outer diameter R, obtained by the sintering step described above, is annealed by an annealing apparatus illustrated in FIG. 4 before doping an alkali metal (step ST40: first annealing treatment). The annealing apparatus in FIG. 4 includes a heating container 400 provided with a heater 410. The heating container 400 has a gas inlet 400A for supplying only $N_2$ gas (an atmosphere not containing He gas) and an exhaust port 400B for exhausting $N_2$ gas. Further, a thermometer 420 is installed in the heating container 400, and a temperature control unit 430 controls the heating temperature of the heater 410 to manage the temperature (set to 1,050° C.) in the heating container 400. Note that the first annealing treatment by the temperature control unit 430 is performed for the annealing time determined with reference to the result data 700 in step ST30.

In the doping step performed after the first annealing treatment of step ST40, the transparent glass rod after the first annealing treatment is elongated so as to have a predetermined outer diameter. Subsequently, a hole is formed in the center region of the stretched transparent glass rod along the longitudinal direction of the transparent glass rod. FIG. 5 illustrates a doping step in which the alkali metal is doped to the transparent glass rod 500 in which a hole 510 is formed by the CVD method.

Specifically, in the alkali metal doping of step ST60, potassium (K) is doped as the alkali metal to the inner surface of the hole 510 provided in the transparent glass rod 500. Potassium bromide (KBr) is used as a raw material (KBr vapor is generated by heating KBr by an external heat source). The transparent glass rod 500 is externally heated by a burner (oxyhydrogen burner) 520 while introducing KBr vapor into the hole 510 of the transparent glass rod 500 using oxygen as a carrier gas. During the heating by the burner 520, the transparent glass rod 500 is rotated in a direction indicated by arrow S5, and the burner 520 reciprocates plural times along the direction indicated by arrow S6. As a result, the element K is diffused and doped to the inner surface of the hole 510 formed in the transparent glass rod 500.

As illustrated in FIG. 6, the rod-in collapsing in step ST70 includes solidifying the transparent glass rod 500 (step ST71), forming the peripheral core portion around the solidified transparent glass rod (center rod 600) (step ST72), and stretching (step ST73). Specifically, the transparent glass rod 500 doped with the alkali metal in step ST60 is solidified in step ST71 to obtain the center rod 600.

Further, in step ST72 of FIG. 6, the center rod 600 obtained in step ST71 is inserted into an insertion hole 625 formed in a glass tube 620, which is to be formed as the peripheral core portion, in a direction indicated by arrow S8. In the inserted state, the center rod 600 and the glass tube 620 are integrated by heating. Note that the rod-in collapsing in step ST72 may be performed plural times. Further, in step ST73 of FIG. 6, the integrated rod is stretched to obtain the core preform 110 having the desired outer diameter. Note that the core preform 110 is constituted by a center core portion 111 and a peripheral core portion 112 in which the center core portion 111 is a region corresponds to the above-described center rod 600.

In the cladding portion producing step (step ST90) for providing the cladding portion over the outer periphery of the core preform 110 produced as described above, the porous body (soot body) is deposited over the outer periphery of the core preform 110 by the type-B, OVD illustrated in FIG. 2. Subsequently, the obtained porous body is subjected to the dehydration treatment, the sintering treatment (to provide a transparent glass), and the stretching treatment by the apparatus of FIG. 3 to obtain the optical fiber preform having the predetermined outer diameter.

The obtained optical fiber preform is subjected to second annealing treatment (step ST100). The second annealing treatment is also performed by the annealing apparatus illustrated in FIG. 4, but the annealing time may be fixed (e.g., 5 hours) regardless of the outer diameter of the optical fiber preform. The annealing temperature is about 1,050° C. Therefore, the annealing time of the second annealing treatment may be shorter than the annealing time of the first annealing treatment (step ST60).

FIG. 7 illustrates an optical fiber preform 100 after the second annealing treatment described above. As illustrated in FIG. 7, the optical fiber preform 100 after the second annealing treatment includes the core preform 110 and a cladding portion 120 provided on the outer periphery of the core preform 110. Further, the core preform 110 includes the center core portion 111 (corresponding to the center rod 600 in FIG. 6) doped with the alkali metal and the peripheral core portion 112. In a measuring step of step ST110, a portion 100A of the optical fiber preform 100 is cut out from the optical fiber preform 100 as a sample preform, as illustrated in FIG. 7. Subsequently, the residual He-concentration in a region (center core portion 111) corresponding to the center rod of the cut sample preform 100A is measured. Further, the measured residual He-concentration is accumulated to the result data 700 together with the annealing time for the first annealing treatment determined in step ST30.

Figure 8:
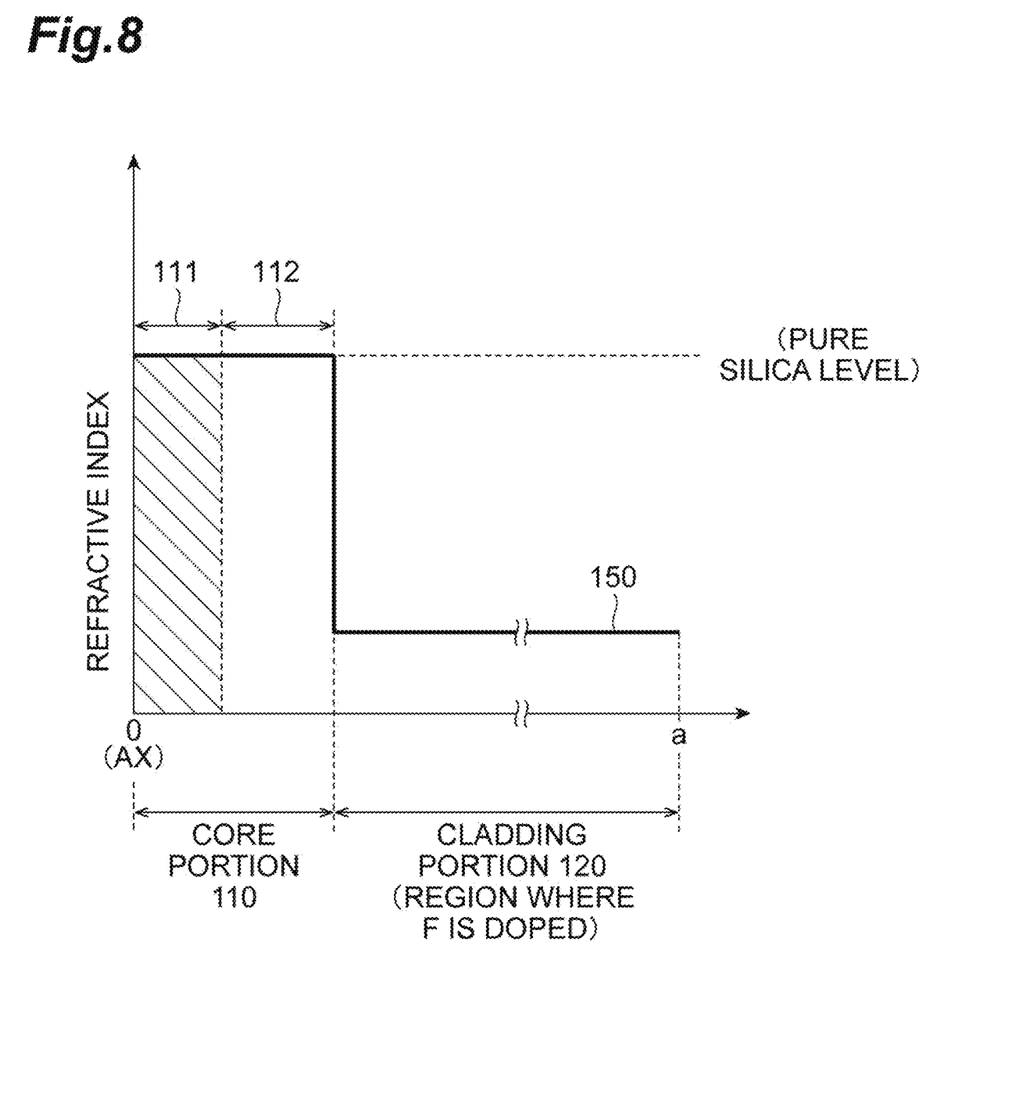
FIG. 8 is an example of a refractive index distribution of the optical fiber preform.

FIG. 8 illustrates an example of the refractive index distribution of the optical fiber preform 100 produced as described above. In the example of a refractive index distribution 150 illustrated in FIG. 8, no impurity for adjusting the refractive index is doped to the core portion (core preform) 110, but F is doped to the cladding portion 120 to set the refractive index of the cladding portion to be lower than the refractive index of the core portion 110.

Figure 9:
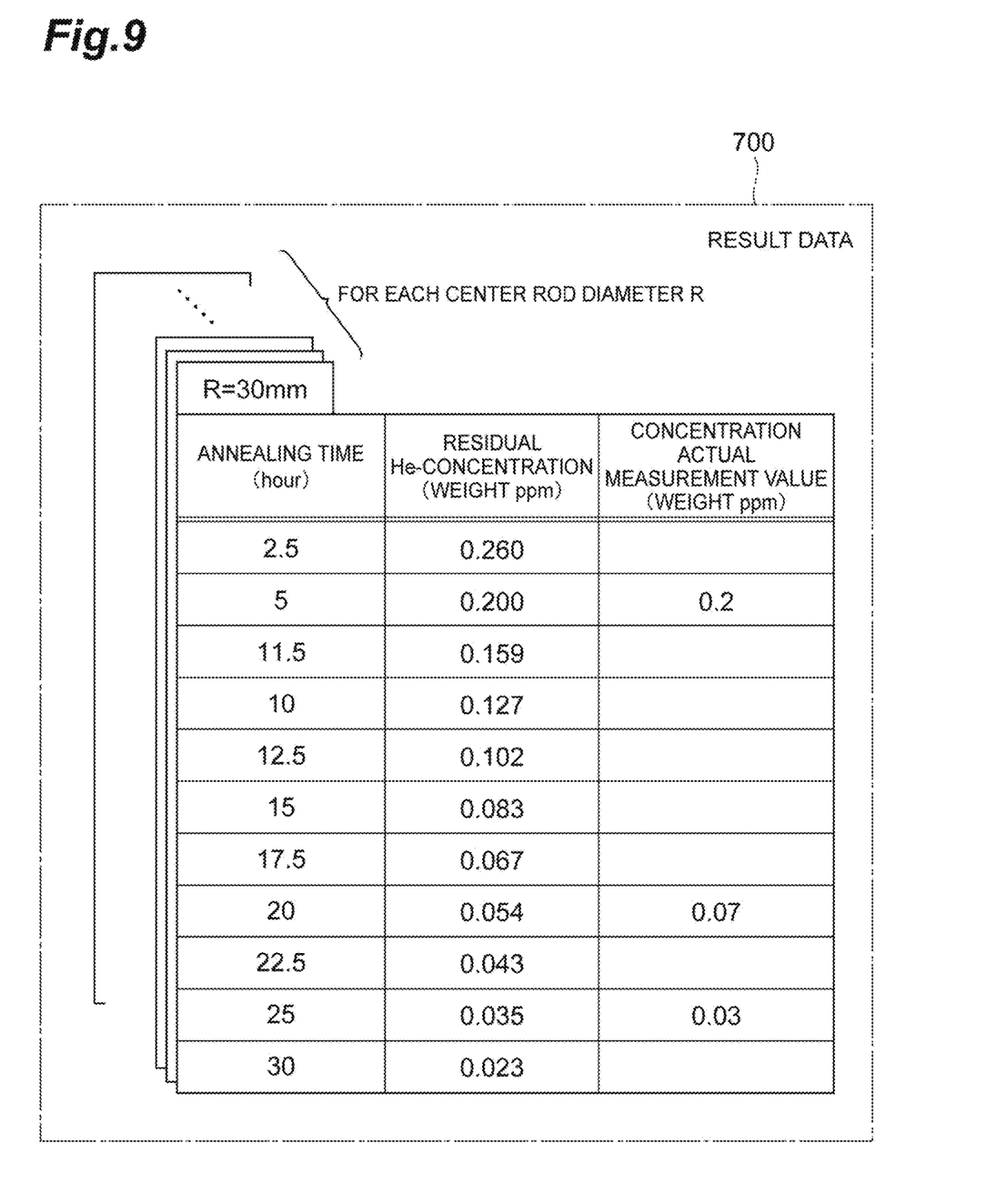
FIG. 9 is a diagram for explaining an example of result data.
Figure 10:
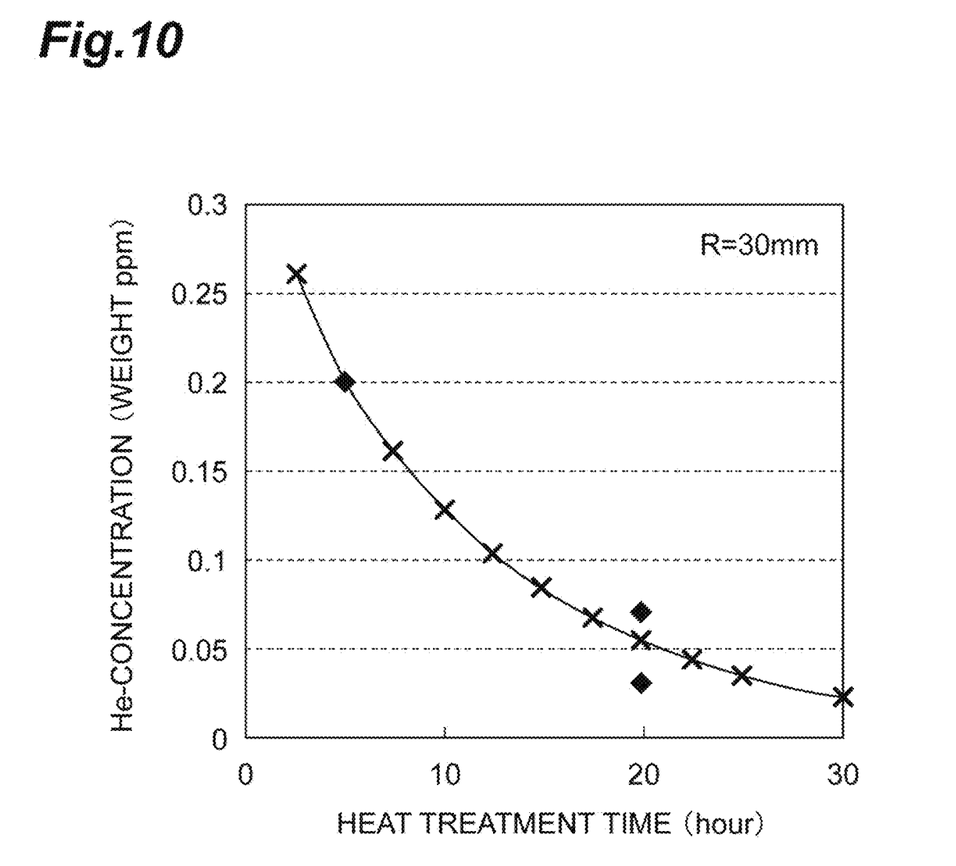
FIG. 10 is a graph plotting a relationship between annealing time and residual He-concentration [weight ppm] of a center rod having an outer diameter of 30 mm.

Further, the result data 700 used in determining the annealing time in step ST30 records, for example, as illustrated in FIG. 9, a relationship between the annealing time and the residual He-concentration after the annealing for each outer diameter of the center rod (corresponding to the center core portion 111). Further, the result data 700 is updated continually each time the optical fiber preform 100 is produced, that is, the measuring step of step ST110 is performed, by accumulating the annealing time determined in step ST30 and actual measured values of the residual He-concentration. Note that FIG. 9 illustrates the theoretical values (the table of He-concentration-to-time depending on the outer diameter of the center rod R=30 mm) and the actual measurement values of the residual He-concentration for every annealing time. FIG. 10 is a graph plotting the table of He-concentration-to-time (theoretical values) of the center rod having the outer diameter R=30 mm of the result data 700 illustrated in FIG. 9. Further, in FIG. 10, the heat treatment time on the horizontal axis represents the annealing time, and the He-concentration on the vertical axis represents the residual He-concentration.

Note that, although the result data 700 in FIG. 9 illustrates the relationship between the annealing time and the residual He-concentration of the center rod having the outer diameter R of 30 mm, the relationship between the annealing time and the outer diameter of the center rod is such that the annealing time of the center rod having the outer diameter RT (mm) is determined from a known relationship between the annealing time and the residual He-concentration of the center rod having a reference outer diameter R (i.e., the table of He-concentration-to-time depending on the outer diameter of 30 mm as illustrated in FIG. 9). Specifically, assuming that the outer diameter R of the center rod, in which the relationship between the residual He-concentration C [weight ppm] and the annealing time T [hour] is known, as a reference outer diameter (thus, the center rod having the outer diameter R is referred to as the reference rod), to control the residual He-concentration in the center rod having the outer diameter RT to C [weight ppm] or less, it is necessary to anneal the center rod having the outer diameter RT (at the annealing temperature of about 900° C. to 1,100° C.) for the annealing time TT (=C×(RT/R)$^2$) which is obtained by multiplying the annealing time T (the annealing time necessary to control the residual He-concentration of the reference rod to C [weight ppm] or less) by a numerical value (RT/R)$^2$ specified by the square of the outer diameter ratio (RT/R). Specifically, when the reference outer diameter R is set to 30 mm (example in FIG. 9), to control the residual He-concentration of the center rod having the outer diameter 60 mm to 0.127 [weight ppm] or less, the annealing time (40 [hour]) obtained by quadrupling the annealing time of 10 [hour] required for the reference rod (a numerical value defined by the square of the outer diameter ratio 2 (=60 mm/30 mm)) is necessary. In addition, according to the findings of the inventors, if the maximum value of residual He-concentration in the center core portion (center rod) 111 is adjusted to 0.15 [weight ppm] or less, the occurrence of spiking during drawing of the base metal is effectively prevented and, at this time, the Cl-concentration in the center core portion 111 is 1,000 ppm or less. Therefore, as can be seen from FIGS. 9 and 10, the annealing time in the first annealing treatment step (step ST40) performed on the center rod having the outer diameter of 30 mm needs to be at least 7.5 hours.

Figure 11:
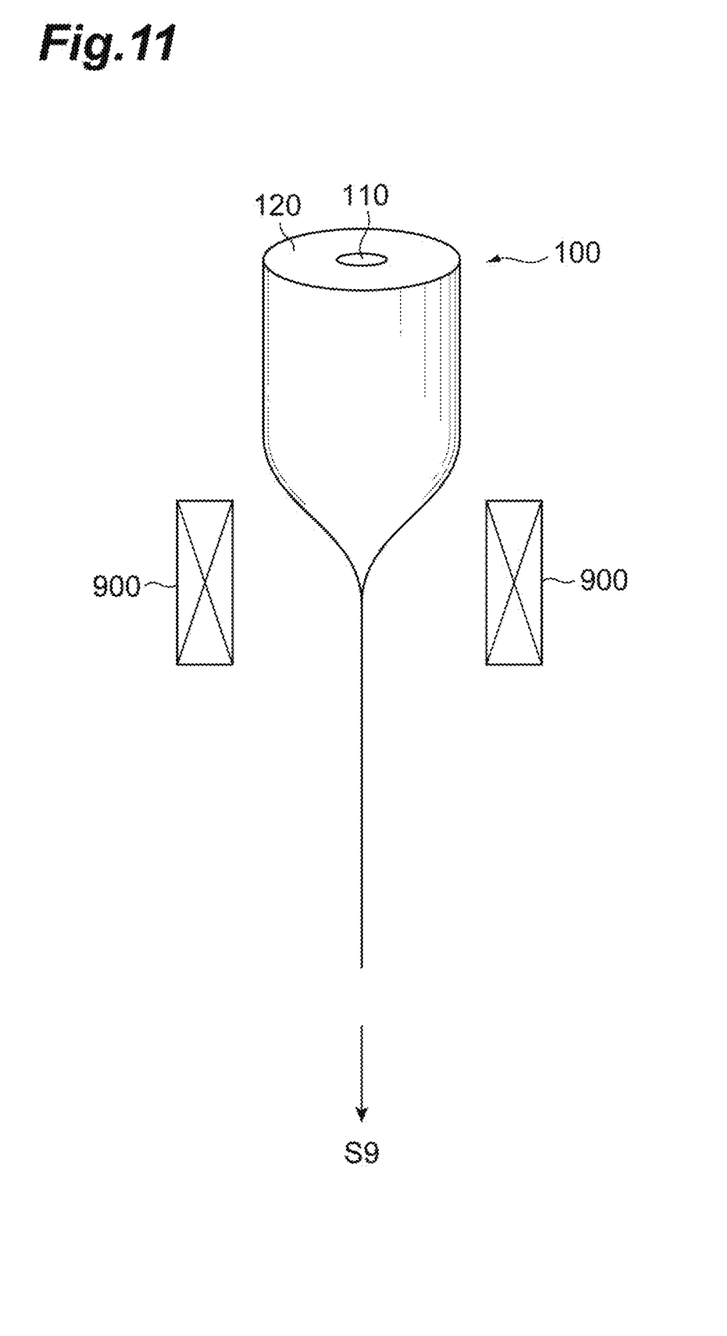
FIG. 11 is a diagram for explaining a drawing step.

The optical fiber can be obtained by drawing the optical fiber preform 100 produced as described above. Specifically, as illustrated in FIG. 11, one end of the optical fiber preform 100 is drawn in the direction indicated by arrow S9, while being heated by the heater 900, whereby the optical fiber having a refractive index distribution similar to that illustrated in FIG. 8 is obtained.

From the above description of the present invention, it is apparent that the present invention can be modified in various ways. Such modifications cannot be construed as departing from the spirit and scope of the invention, and modifications obvious to those skilled in the art are intended to be included within the scope of the following claims.

REFERENCE SIGNS LIST

100 . . . Optical fiber preform; 110 . . . Core preform (core portion); 111, 600 . . . Center rod (center core portion); 112 . . . Peripheral core portion; 120 . . . Cladding portion; 230, 520 . . . Burner; 410, 900 . . . Heater; 420 . . . Thermometer; 430 . . . Temperature control unit; and 700 . . . Result data (including table of He-concentration-to-time).

The invention claimed is:
1. An optical fiber preform comprising:
a core preform including a center rod with an alkali metal doped region formed along a longitudinal direction and mainly comprised of silica glass; and
a cladding portion provided on an outer periphery of the core preform and mainly comprised of silica glass, wherein
a maximum value of Cl-concentration in the center rod is 1,000 ppm or less and a maximum value of residual He-concentration in the center rod is greater than 0 [weight ppm] and 0.15 [weight ppm] or less.

* * * * *